(12) United States Patent
Nguyen et al.

(10) Patent No.: US 12,626,490 B2
(45) Date of Patent: May 12, 2026

(54) CROSS-MODAL MANIFOLD ALIGNMENT ACROSS DIFFERENT DATA DOMAINS

(71) Applicant: Booz Allen Hamilton Inc., McLean, VA (US)

(72) Inventors: Andre Tai Nguyen, Columbia, MD (US); Luke Edward Richards, Ellicott City, MD (US); Edward Simon Paster Raff, Jamesville, NY (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 1054 days.

(21) Appl. No.: 17/343,474

(22) Filed: Jun. 9, 2021

(65) Prior Publication Data

US 2021/0406309 A1 Dec. 30, 2021

Related U.S. Application Data

(60) Provisional application No. 63/036,957, filed on Jun. 9, 2020.

(51) Int. Cl.
| | |
|---|---|
| *G06V 10/77* | (2022.01) |
| *G06F 18/2134* | (2023.01) |
| *G06F 18/2135* | (2023.01) |
| *G06F 18/2137* | (2023.01) |

(52) U.S. Cl.
CPC .... *G06V 10/7715* (2022.01); *G06F 18/21345* (2023.01); *G06F 18/21355* (2023.01); *G06F 18/2137* (2023.01)

(58) Field of Classification Search
CPC .......... G06V 10/7715; G06F 18/21355; G06F 18/21345; G06F 18/2137
See application file for complete search history.

(56) References Cited

PUBLICATIONS

Richards, L., et al, "A Manifold Alignment Approach to Grounded Language Learning," in the 8th Northeast Robotics Colloquium</i> , 2019. (Year: 2019).*
Carvalho, M., et al, "Cross-Modal Retrieval in the Cooking Context: Learning Semantic Text-Image Embeddings," in The 41st International ACM SIGIR Conference on Research & Development in Information Retrieval</i>, 2018, pp. 35-44. (Year: 2018).*
Ross, A., "Procrustes Analysis," 2004. (Year: 2004).*
Aalto, Max, et al., "Metric learning on manifolds", arXiv preprint arXiv:1902.01738, 2019.

(Continued)

*Primary Examiner* — Michael H Hoang
(74) *Attorney, Agent, or Firm* — Buchanan Ingersoll & Rooney PC

(57) ABSTRACT

A method and system for cross-modal manifold alignment of different data domains includes determining for a shared embedding space a first embedding function for data of a first domain and a second embedding function for data of a second domain using a triplet loss, wherein triplets of the triplet loss include an anchor data point from the first, a positive and a negative data point from the second domain; creating a first mapping for the data of the first domain using the first embedding function in the shared embedding space; creating a second mapping for the data of the second domain using the second embedding function in the shared embedding space; and generating a cross-modal alignment for the data of the first domain and the data of the second domain.

20 Claims, 4 Drawing Sheets

Method for cross-modal manifold alignment of different data domains 200

(56)          References Cited

PUBLICATIONS

Andrew, Galen, et al., "Deep canonical correlation analysis", In International conference on machine learning, pp. 1247-1255, 2013.

Balntas, Vassileios, et al., "Learning local feature descriptors with triplets and shallow convolutional neural networks", In Bmvc, vol. 1, p. 3, 2016.

Bo, Liefeng, et al., "Object recognition with hierarchical kernel descriptors", In Computer Vision and Pattern Recognition, 2011.

Carvalho, Micael, et al., "Cross-modal retrieval in the cooking context: Learning semantic text-image embeddings", In The 41st International ACM SIGIR Conference on Research & Development in Information Retrieval. ACM, 2018.

Choi, Sungjoon, et al., "Nonparametric motion retargeting for humanoid robots on shared latent space", In Proceedings of Robotics: Science and Systems (R:SS) 2020. Robotics: Science and Systems (RSS), 2020.

Cohen, Vanya, et al., "Grounding Language Attributes to Objects using Bayesian Eigenobjects", 2019.

Craswell, Nick, "Mean reciprocal rank", Encyclopedia of database systems, 1703, 2009.

Devlin, Jacob, et al., "BERT: Pre-training of Deep Bidirectional Transformers for Language Understanding", pp. 4171-4186, 2018.

Diaz, Fernando, et al., "Pseudo-aligned multi-lingual corpora", In IJCAI, pp. 2727-2732, 2007.

Eitel, Andreas, et al., "Multimodal deep learning for robust {RGB-D} object recognition", International Conference on Intelligent Robots and Systems (IROS), pp. 681-687, 2015.

Fain, Mikhail, et al., "Dividing and Conquering Cross-Modal Recipe Retrieval: from Nearest Neighbours Baselines to SoTA", 2019.

Gower, John C., "Generalized procrustes analysis", Psychometrika, 40(1):33-51, 1975.

Harnad, Stevan, "The symbol grounding problem", Physica D: Nonlinear Phenomena, 42(1-3):335-346, 1990.

He, Kaiming, et al., "Deep residual learning for image recognition", In Proceed-ings of the IEEE conference on computer vision and pattern recognition, pp. 770-778, 2016.

Hermans, Alexander, et al., "In defense of the triplet loss for person re-identification" , preprint arXiv:1703.07737, 2017.

Hotelling, Harold, "Relations between two sets of variates", In Breakthroughs in statistics, pp. 162-190. Springer, 1992.

Kaya, Mahmut, et al., "Deep metric learning: A survey", 2019. ISSN 20738994.

Kingma, Diederik P., et al., "Adam: A Method for Stochastic Optimization", 3rd International Conference for Learning Representations, 2015.

Knepper, Ross A., et al., "Recovering from failure by asking for help", Autonomous Robots, 39(3):347-362, Oct. 2015.

Krishna, Ranjay, et al., "Visual Genome: Connecting Language and Vision Using Crowdsourced Dense Image Annotations", International Journal of Computer Vision, 123:32-73, 2016.

Lai, Kevin, et al., "A large-scale hierarchical multi-view {RGB-D} object dataset", In 2011 IEEE international conference on robotics and automation, pp. 1817-1824. IEEE, 2011.

Lazaridou, Angeliki, et al., "Is this a wampimuk? cross-modal mapping between distributional semantics and the visual world", In Proceedings of the 52nd Annual Meeting of the Association for Computational Linguistics (vol. 1: Long Papers), pp. 1403-1414, 2014.

Lu, Jiasen, et al., "ViLBERT: Pretraining Task-Agnostic Visiolinguistic Representations for Vision-and-Language Tasks", 2019.

Marin, Javier, "Recipe1m+: A dataset for learning cross-modal embeddings for cooking recipes and food images", IEEE transactions on pattern analysis and machine intelligence, 2019.

Mcinnes, Leland, et al., "UMAP: Uniform Manifold Approximation and Projection for Dimension Reduction", 2018.

Nguyen, Thao, et al., "Robot object retrieval with contextual natural language queries" , In Proceedings of Robotics: Science and Systems (R:SS) 2020. Robotics: Science and Systems (RSS), 2020.

Paul, Rohan, et al., "Efficient grounding of abstract spatial concepts for natural language interaction with robot platforms", The International Journal of Robotics Research, 37 (10):1269-1299, 2018.

Pillai, Nisha, et al., "Deep Learning for Category-Free Grounded Language Acquisition", In Proc. of the NAACL Combined Workshop on Spatial Language Understanding and Grounded Communication for Robotics (NAACL-SpLU-RoboNLP), Minneapolis, MI, USA, Jun. 2019.

Pillai, Nisha, et al., "Unsupervised Selection of Negative Examples for Grounded Language Learning", In Proceedings of the 32nd National Conference on Artificial Intelligence (AAAI), New Orleans, USA, 2018.

Plummer, Bryan A., et al., "Flickr30k Entities: Collecting Region-to-Phrase Correspondences for Richer Image-to-Sentence Models", 2015 IEEE International Conference on Computer Vision (ICCV), 2015.

Reimers, Nils, et al., "Sentence-BERT: Sentence embeddings using Siamese BERT—networks", In Proceedings of the 2019 Conference on Empirical Methods in Natural Language Processing and the 9th International Joint Conference on Natural Language Processing (EMNLP-IJCNLP), pp. 3982-3992, Hong Kong, China, Nov. 2019. Association for Computational Linguistics. doi: 10.18653/v1/D19-1410. https://www.aclweb. org/anthology/D19-1410.

Richards, Luke E., et al., "Learning to Understand Non-Categorical Physical Language for Human-Robot Interactions", In Proc. of the R:SS 2019 workshop on AI and Its Alternatives in Assistive and Collaborative Robotics (RSS: AI+ACR), Freiburg, Germany, Jun. 2019.

Salvador, Amaia, et al., "Learning cross-modal embeddings for cooking recipes and food images", In Proceedings of the IEEE conference on computer vision and pattern recognition, pp. 3020-3028, 2017.

Schroff, Florian, et al., "Facenet: A unified embedding for face recognition and clustering", In Proc. of the IEEE conference on computer vision and pattern recognition (CVPR), 2015.

She, Lanbo, et al., "Interactive Learning of Grounded Verb Semantics towards Human-Robot Communication", In ACL, 2017.

Sinapov, Jivko, et al., "Learning to order objects using haptic and proprioceptive exploratory behaviors", In IJCAI, pp. 3462-3468, 2016.

Su, Weijie, et al., "VI-bert: Pre-training of generic visual-linguistic representations", ICLR, 2020.

Thomason, Jesse, et al., "Learning Multi-Modal Grounded Linguistic Semantics by Playing I Spy", In IJ-CAI, pp. 3477-3483, 2016.

Wang, Chang, et al., "Manifold alignment preserving global geometry", In 23rd International Joint Con-ference on Artificial Intelligence (IJCAI), 2013.

Wang, Wei, et al., "Backpropagation-friendly eigendecomposition", In Advances in Neural Information Processing Systems, pp. 3162-3170, 2019.

Wang, Weiran, et al., "Stochastic Optimization for Deep CCA via Nonlinear Orthogonal Iterations", Oct. 2015.

* cited by examiner

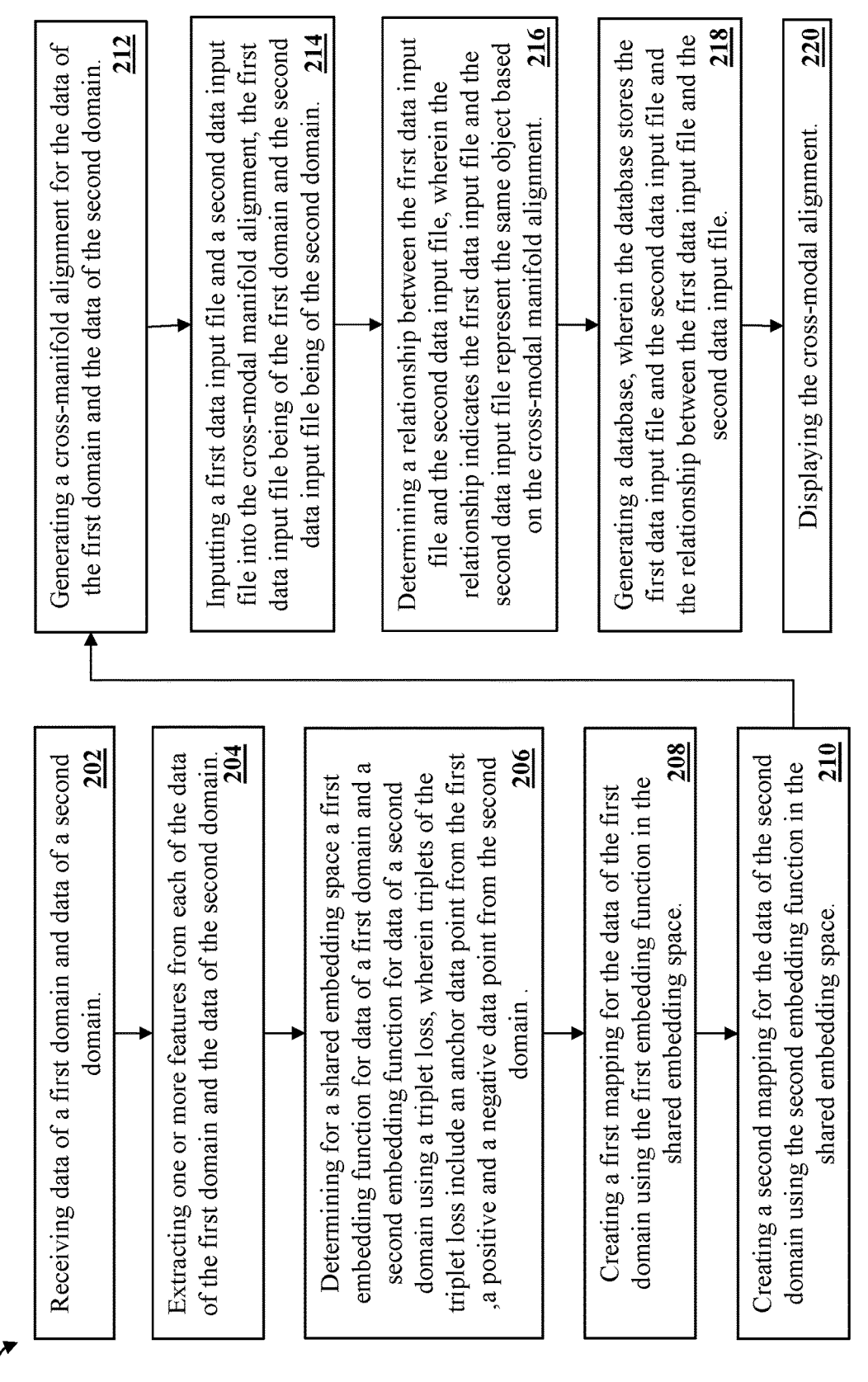

Method for cross-modal manifold alignment of different data domains 200

Receiving data of a first domain and data of a second domain. 202

Extracting one or more features from each of the data of the first domain and the data of the second domain. 204

Determining for a shared embedding space a first embedding function for data of a first domain and a second embedding function for data of a second domain using a triplet loss, wherein triplets of the triplet loss include an anchor data point from the first ,a positive and a negative data point from the second domain . 206

Creating a first mapping for the data of the first domain using the first embedding function in the shared embedding space. 208

Creating a second mapping for the data of the second domain using the second embedding function in the shared embedding space. 210

Generating a cross-manifold alignment for the data of the first domain and the data of the second domain. 212

Inputting a first data input file and a second data input file into the cross-modal manifold alignment, the first data input file being of the first domain and the second data input file being of the second domain. 214

Determining a relationship between the first data input file and the second data input file, wherein the relationship indicates the first data input file and the second data input file represent the same object based on the cross-modal manifold alignment. 216

Generating a database, wherein the database stores the first data input file and the second data input file and the relationship between the first data input file and the second data input file. 218

Displaying the cross-modal alignment. 220

FIG. 2

CROSS-MODAL MANIFOLD ALIGNMENT ACROSS DIFFERENT DATA DOMAINS

FIELD

The present disclosure relates to methods and systems for cross-modal manifold alignment of data from different domains, and more particularly to using triplet loss for manifold alignment in the context of grounded language.

BACKGROUND

Artificial intelligence-enabled devices are becoming increasingly more advanced and affordable and thus ever more present in our daily lives. Therefore, there is a great interest in making such devices as intuitive and easy to interact with as possible. Language offers an approachable and relatively accessible interface without requiring prior training on the part of the user. We have seen the integration of voice-assistant speakers in homes drastically increase in recent years, and language may become a preferred method for interacting with AI-enabled assistants. However, understanding how such devices' recognition of natural language can be best grounded to the physical world is still very much an open problem. Combining language and robotics creates unique challenges that much of the current work on grounded language learning has not addressed. One such way of combining language and robotics is the use of manifold alignment which finds a mapping from heterogeneous representations to a shared structure in latent space. Manifold alignment makes the assumption that there is an underlying latent manifold that datasets share, which is obtained by leveraging correspondences between paired data elements. Current work in the area of manifold alignment as it is applied to learning groundings between language and physical context relies on extensive databases such as the Recipe 1M dataset that contains one million cooking recipes and eight hundred thousand food images. In the robotics domain, current approaches to language grounding are very limited in the number of object classes and are restricted to learning joint embeddings. Thus, there is a need for a novel and more effective approach of language grounding, particularly where only smaller datasets of ground truth are available and where the data spans different domains.

SUMMARY

A method for cross-modal manifold alignment of different data domain is disclosed. The method includes determining for a shared embedding space a first embedding function for data of a first domain and a second embedding function for data of a second domain using a triplet loss, wherein triplets of the triplet loss include an anchor data point from the first domain, and a positive and a negative data point from the second domain; creating a first mapping for the data of the first domain using the first embedding function in the shared embedding space; creating a second mapping for the data of the second domain using the second embedding function in the shared embedding space; and generating a cross-modal alignment for the data of the first domain and the data of the second domain. The generating of the cross-modal alignment can include: superimposing the first mapping and the second mapping to generate a cross-modal manifold alignment. The superimposing of the first mapping and the second mapping can include one or more of the following: translating the first mapping and the second mapping in the shared embedding space, scaling the first mapping and the second mapping in the shared embedding space, and/or rotating the first mapping and the second mapping in the shared embedding space. The method can also include inputting a first data input file and a second data input file into the cross-modal manifold alignment, the first data input file being of the first domain and the second data input file being of the second domain; determining a relationship between the first data input file and the second data input file, wherein the relationship indicates the first data input file and the second data input file represent the same object based on the cross-modal manifold alignment; and storing in a database the first data input file and the second data input file and the relationship between the first data input file and the second data input file.

A system for cross-modal manifold alignment of different data domains is disclosed. The system includes a processor configured to: determine for a shared embedding space a first embedding function for data of a first domain and a second embedding function for data of a second domain using triplet loss, wherein triplets of the triplet loss include an anchor data point from the first domain, and a positive and a negative data point from the second domain; create a first mapping for the data of the first domain using the first embedding function in the shared embedding space; create a second mapping for the data of the second domain using the second embedding function in the shared embedding space; and generate a cross-modal alignment for the data of the first domain and the data of the second domain. The generating the cross-modal alignment involves the processor being configured to: superimpose the first mapping and the second mapping to generate a cross-modal manifold alignment. The superimposing the first mapping and the second mapping involves the processor being configured to perform at least one of the following: translate the first mapping and the second mapping in the shared embedding space, scale the first mapping and the second mapping in the shared embedding space, and/or rotate the first mapping and the second mapping in the shared embedding space. The processor can also be configured to: input a first data input file and a second data input file into the cross-modal manifold alignment, the first data input file being of the first domain and the second data input file being of the second domain; determine a relationship between the first data input file and the second data input file, wherein the relationship indicates the first data input file and the second data input file represent the same object based on the cross-modal manifold alignment; and store in a database, the first data input file and the second data input file and the relationship between the first data input file and the second data input file.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 2 is a flow chart illustrating an exemplary method for cross-modal alignment for data of different domains in accordance with exemplary embodiments.

DETAILED DESCRIPTION

Currently, acquiring grounded language, i.e., learning associations between symbols in language and their referents in the physical world, is achieved in various ways. The majority of current technologies and processes focus on grounding language to RGB images due to the availability of large annotated datasets consisting of millions of RGB images and associated language labels. However, large annotated datasets are rare in the field of grounded language for robotics, especially datasets containing depth information in the form of RGB-D. This is a complex problem space, and learning has been demonstrated successfully in domains as varied as soliciting human assistance with tasks, interactive learning, and understanding complex spatial expressions. However, many current technologies and processes utilize simplifying assumptions such as using a bag-of-words language model and focusing on using domain-specific visual features for training classifier models. Exemplary embodiments of the methods and systems provided herein address these assumptions and assume neither a particular language model nor specific visual features. Exemplary embodiments of the methods and systems provided herein approach the grounding problem as a manifold alignment problem by creating a mapping from heterogeneous representations to a shared manifold in a latent space. In particular, embodiments of the methods and systems provided herein demonstrate how to recast existing but disparate language and vision domain representations into a joint space by learning to transform both language and RGB-D sensor data embeddings into a joint space using manifold alignment. Thus, exemplary embodiments of the methods and systems provided herein enable the learning of grounded language in a cross-domain manner and provide a bridge between the noisy, multi-domain perceived world of the robotic agent and unconstrained natural language. Further, exemplary embodiments of the methods and systems provided herein utilize triplet loss in combination with Procrustes analysis to achieve the alignment of language and vision. Exemplary embodiments of the methods and systems provided herein may utilize existing feature extractors enabling integration with existing robot language and vision models with little additional overhead. Therefore, exemplary embodiments of the methods and systems provided herein 1) introduce an easy to implement manifold alignment approach to the grounded language problem for systems where sensor data representations do not live in the same space; 2) provide methods and systems generalizable to the unsupervised setting; 3) reduce reliance on or need for post-processing steps such as Procrustes analysis; and 4) provide methods and systems that are effective in lower resource and dataset environments compared to traditional uses of manifold alignment in grounded language learning.

System Overview

Figure 1A:
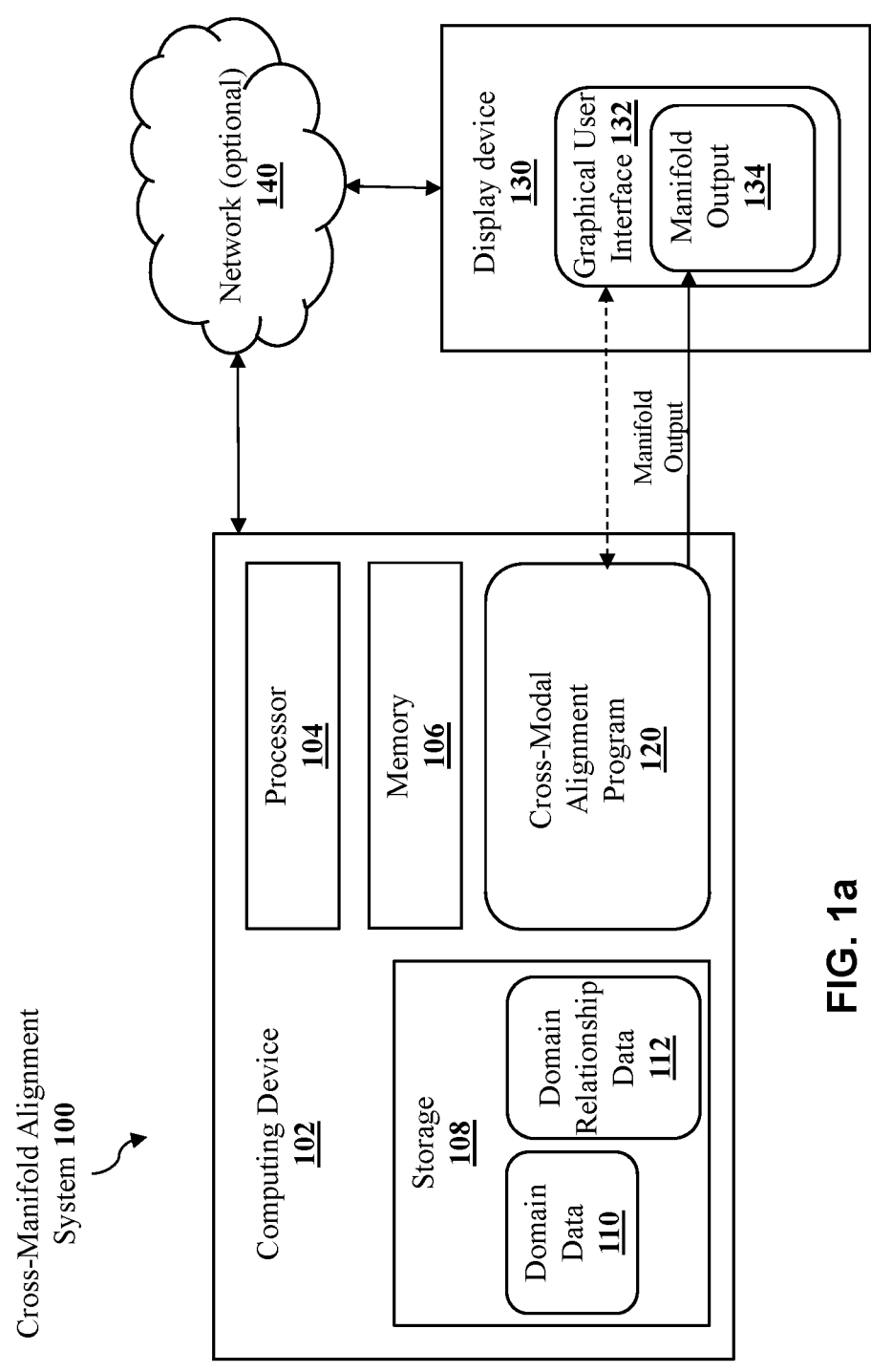
FIG. 1a is a block diagram illustrating a high-level system architecture for cross-modal alignment for data of different domains in accordance with exemplary embodiments.
Figure 1B:
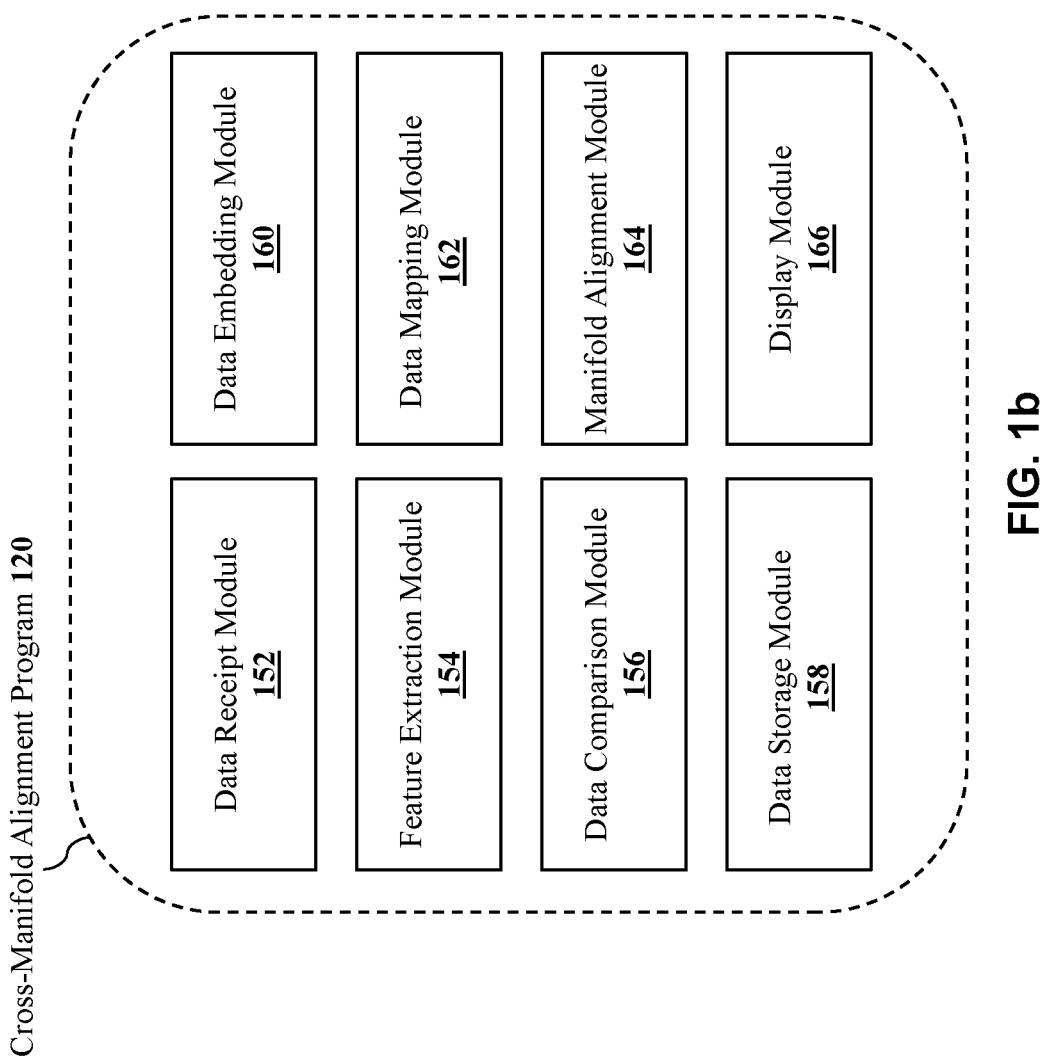
FIG. 1b is a block diagram illustrating an example modules of the cross-modal alignment program of FIG. 1a in accordance with exemplary embodiments.

FIG. 1a illustrates system 100 for cross-modal alignment for data of different domains in accordance with exemplary embodiments.

The computing device 102 includes, for example, a processor 104, a memory 106, a storage 108, and a cross-modal alignment program 120. The device 102 may be a desktop computer, a notebook, a laptop computer, a tablet computer, a handheld device, a smart-phone, a thin client, or any other electronic device or computing system capable of storing, compiling, and organizing audio, visual, or textual data and receiving and sending that data to and from other computing devices, such as the display device 130.

The processor 104 may be a special purpose or a general purpose processor device specifically configured to perform the functions discussed herein. The processor 104 unit or device as discussed herein may be a single processor, a plurality of processors, or combinations thereof. Processor devices may have one or more processor "cores." In an exemplary embodiment, the processor 104 is configured to perform the functions associated with the modules of the cross-modal alignment program 120 as discussed below with reference to FIGS. 1b-3.

The memory 106 can be a random access memory, read-only memory, or any other known memory configurations. Further, the memory 106 can include one or more additional memories including the storage 108 in some embodiments. The memory 106 and the one or more additional memories can be read from and/or written to in a well-known manner. In an embodiment, the memory and the one or more additional memories can be non-transitory computer readable recording media. Memory semiconductors (e.g., DRAMs, etc.) can be means for providing software to the computing device such as the cross-modal alignment program 120. Computer programs, e.g., computer control logic, can be stored in the memory 106.

The storage 108 can include domain data 110 and domain relationship data 112. The storage 108 can be deployed on one or more nodes, e.g., storage or memory nodes, or more processing-capable nodes such as a server computer, desktop computer, notebook computer, laptop computer, tablet computer, handheld device, smart-phone, thin client, or any other electronic device or computing system capable of storing, compiling, and/or processing data and computer instructions (e.g., domain data 110 and domain relationship data 112), and receiving and sending that data to and from other devices, such as the computing device 102 and/or the display device 130. The domain data 110 can include data from any domain capable of being received or collected and may be from one or more modalities such as, but not limited to, image data, language data, audio data, pressure data, temperature data, haptic data, visual data, location data, gyroscopic data, speed data, or any other data domain capable of being collected, obtained, monitored, etc. The domain relationship data 112 may consist of pairs of data of different domains and/or modalities with an associated relationship function. For example, where the data pair is from different modalities, the domain relationship data 112 may contain a data pair of a textual file and an image file that describe and depict, respectively, the same object. For example, where the data pair is from the same modality, the domain relationship data 112 may contain a data pair of an image file from one domain (e.g. a first image type) and an image file from a second domain (e.g., a second image type) that describe and depict, respectively, the same object. The storage 108 can be any suitable storage configuration, such as, but not limited to, a relational database, a structured query language (SQL) database, a distributed database, or an object database, etc. Suitable configurations and storage types will be apparent to persons having skill in the relevant art.

The cross-modal alignment program 120 is a software component that utilizes the domain data 110 stored in the storage 108 to generate a manifold alignment between data of different domains (e.g., different data types of the same modality) and/or different modalities (e.g., language data and image data). As used herein, a modality may have one or more domains. For example, a language modality may have a domain for textual language, a domain for audio recordings of language, and separate domains for different languages. In some instances, a modality may only have a single domain and the terms "modality" and "domain" may be interchangeable. In an exemplary embodiment, the cross-modal alignment program 120 includes a data receipt module 152, a feature extraction module 154, a data comparison module 156, a data storage module 158, a data embedding module 160, a data mapping module 162, a manifold alignment module 164, and a display module 166. The cross-modal alignment program 120 is a software component specifically programmed to implement the methods and functions disclosed herein for cross-modal alignment for data of different domains. The cross-modal alignment program 120 and the modules 152-166 are discussed in more detail below with reference to FIG. 2.

The cross-modal alignment program 120 can include a graphical user interface 132. The graphical user interface 132 can include components used to receive input from the computing device 102, and/or the display device 130 and transmit the input to the cross-modal alignment program 120 or conversely to receive information from the cross-modal alignment program 120 and display the information on the computing device 102, and/or the display device 130. In an example embodiment, the graphical user interface 132 uses a combination of technologies and devices, such as device drivers, to provide a platform to enable users of the computing device 102, and/or the display device 130 to interact with the cross-modal alignment program 120. In the example embodiment, the graphical user interface 132 receives input from a physical input device, such as a keyboard, mouse, touchpad, touchscreen, camera, microphone, etc. In an exemplary embodiment, the graphical user interface 132 may display a manifold output 134 that illustrates a shared manifold between data from different domains in latent space. While the graphical user interface 132 is illustrated as part of the display device 130, it can be appreciated that the graphical user interface 132 is a part of the cross-modal alignment program 120 and may be a part of the computing device 102, and/or the display device 130.

While the processor 104, the memory 106, the storage 108, and cross-modal alignment program 120 are illustrated as part of the computing device 102, it can be appreciated that each of these elements or a combination thereof can be a part of a separate computing device.

The display device 130 can include the graphical user interface 132. The display device 130 be any computing device, such as, but not limited to, a cell phone, a server computer, a desktop computer, a notebook, a laptop computer, a tablet computer, a handheld device, a smart-phone, a thin client, or any other electronic device or computing system capable of receiving display signals from another computing device, such as the computing device 102, etc. and outputting those display signals to a display unit such as, but not limited to, an LCD screen, plasma screen, LED screen, DLP screen, CRT screen, etc. For example, the graphical user interface may receive the manifold output 134 from the cross-modal alignment program 120 and display the manifold output 134 on the display device 130. Further, the graphical user interface may receive data input files from a user and transmit those data input files to the cross-modal alignment program 120. The data input files can include a single piece of data (e.g., a single image) or multiple pieces of data (e.g., a plurality images). The display device 130 may communicate with the computing device 102 via a hard-wired connection or via the network 140. For example, the display device 130 may have a hard-wired connection to the image device such as, but not limited to, a USB connection, an HDMI connection, a display port connection, a VGA connection, or any other known hard-wired connection capable of transmitting and/or receiving data between the computing device 102 and the display device 130. While the display device 130 is illustrated as being separate from the computing device 102, it can be appreciated that the display device 130 can be a part of the computing device 102.

The optional network 140 may be any network suitable for performing the functions as disclosed herein and may include a local area network (LAN), a wide area network (WAN), a wireless network (e.g., WiFi), a personal area network (PAN) (e.g. Bluetooth), a near-field communication (NFC) network, a mobile communication network, a satellite network, the Internet, fiber optic, coaxial cable, other hardwired networks, infrared, radio frequency (RF), or any combination of the foregoing. Other suitable network types and configurations will be apparent to persons having skill in the relevant art. In general, the network 140 can be any combination of connections and protocols that will support communications between the computing device 102 and the display device 130. In some embodiments, the network 140 may be optional based on the configuration of the computing device 102, and the display device 130.

Exemplary Method for Cross-Modal Alignment for Data of Different Domains

FIG. 2 illustrates a method 200 for cross-modal alignment for data of different domains in accordance with exemplary embodiments.

The method 200 can include block 202 of receiving data of a first domain, e.g., the domain data 110, and data of a second domain, e.g., the domain data 110. The data of the first domain and the data of the second domain may come from any dataset or any device including, but not limited to, the computing device 102 and the display device 130. The data of the first domain and the data of the second domain may come from the same or different modalities. For example, where data of the first domain and the data of the second domain are from different modalities, the data of the first domain can come from a first modality (e.g., an RGB-D dataset consisting of RGB-D images) and the data of the second domain may come from a second modality (e.g., a text description), respectively, belonging to one or more classes. For example, without limitation, the data may contain datasets for a tomato, a pear, and a food bag, etc. Each dataset may consist of an RGB image, a depth image, and a textual description of the tomato, pear, and food bag. In the above example, the objects, e.g., the tomato, pear, and food bag, illustrate an ambiguity in natural language since all three could be described as "fruit," e.g., a round red fruit, a sweet green fruit, and a bag of fruit. For example, where data of the first domain and the data of the second domain are from the same modality, the data of the first domain can be a first type of data (e.g., a photograph) from a modality and the data of the second domain can be a second type of data (e.g., an illustration) from the same modality, in this case the modality being image data. In an exemplary embodiment, the data receipt module 152 can be configured to execute the method of block 202.

The method 200 can include block 204 of extracting one or more features from each of the data of the first domain and the data of the second domain. For example, if the first domain is from a first modality (e.g., language), a language feature extraction model may be used such as, but not limited to, a twelve-layer BERT model pre-trained on lowercase English text, or any other suitable language feature extraction model. If the second domain id from a second modality (e.g., vision), a vision feature extraction model may be used such as, but not limited to a ResNet152 pre-trained on ImageNet with its last fully connected layer removed, or any other suitable vision feature extraction model. For the vision feature extraction, the depth component is dealt with via colorization which encodes a depth image as an RGB image where the information contained in the depth data is spread across all three RGB channels. As a result, the same pre-trained ResNet model can be used to process both the RGB image and the transformed depth information. The vectors resulting from the RGB images and the transformed depth information are concatenated to create a final 4,096 dimensional RGB-D vision embedding. If the first domain and the second domain are from the same modality, the feature extraction models would be based on the data type of each domain (e.g., a first data type feature extraction model and a second data type feature extraction model) In an embodiment, a combined extraction model may be used for extracting features from data of both the first domain and the second domain. For example, the ViLBERT (Vision and Language Bidirectional Encoder Representations from Transformers) model can be used to extract features from both vision and language data. In an exemplary embodiment, the feature extraction module 154 can be configured to execute the method of block 204.

The method 200 can include block 206 of determining a first embedding function for data (e.g., the domain data 110) of a first domain and a second embedding function for data (e.g. the domain data 110) of a second domain using a triplet loss The triplets of the triplet loss can include an anchor data point from the first domain and a positive and a negative data point from the second domain. The first domain and the second domain may be from the same modality (e.g., vision) or from different modalities (e.g., vision and language). For example, but not limited to, the first domain may be from a first modality (e.g., Red, Green, Blue, Depth (RGB-D) sensor data from the image modality) and the second domain may be from the same modality, but be a different visual domain data type. Triplet loss seeks to minimize the mapping distance between that data from a common class, e.g., the same domain and/or modality, compared to the mapping distance between data from different classes, e.g., different domains and/or modalities. In particular, triplet loss seeks to minimize the distance between an anchor data point and a positive data point belonging to the same class, e.g., domain and/or modality, as the anchor data point, while maximizing the distance between the anchor data point and a negative data point belonging to a different class, e.g., domain and/or modality. For example, the data of the first domain may be vision data and the first embedding function may be denoted $f_v$ and the data of the second domain may be language data and the second embedding function may be denoted $f_l$. In order to determine $f_v$ and $f_l$, triplet loss triplets are selected to be cross-domain, e.g., from the first domain and the second domain. In an exemplary embodiment, random triplets may be selected such that the anchor data point belongs to either the first domain or the second domain, and the positive and the negative data points can independently belongs to the first domain or the second domain. For example, in the case where the anchor data point ($x_a$) and negative data point ($x_n$) come from the vision domain (i.e., the first domain), and the positive data point ($x_p$) comes from the language domain (i.e., the second domain), the loss for that triplet can be represented as:

$$L = \max(d(f_v(x_a), f_l(x_p)) - d(f_v(x_n)) + a; \ 0) \qquad \text{(Equation 1)}$$

In the above example, $x_a$ could be a cat RGB-D image, $x_p$ a textual description of a cat, and $x_n$ a toaster image. In an exemplary embodiment, the distance metric (d) is cosine distance with a defined margin such as, but not limited to, a=0.4. In an exemplary embodiment, the data embedding module 160 can be configured to execute the method of block 206.

The method 200 can include block 208 of creating a first mapping for the data of the first domain using the first embedding function in a shared embedding space. In an exemplary embodiment, the data mapping module 162 can be configured to execute the method of block 208.

The method 200 can include block 210 of creating a second mapping for the data of the second domain using the second embedding function in the shared embedding space. In an exemplary embodiment, the data mapping module 162 can be configured to execute the method of block 210.

The method 200 can include block 212 of generating a cross-modal alignment, e.g., a manifold alignment, for the data of the first domain and the data of the second domain. In an exemplary embodiment, generating the cross-modal alignment is done by superimposing the first mapping on the second mapping. Further, once the first embedding function and the second embedding function are determined, e.g., $f_v$ and $f_l$, and the data are mapped, a Procrustes analysis may be performed to find the optimal translation, scaling, and rotation of two shapes to minimize the Procrustes distance between the shapes, e.g. the first mapping and the second mapping. The Procrustes analysis finds an optimal rotation matrix R such that the Euclidean distance between the shapes, e.g., the first and second mappings, after translation and scaling is minimized. The rotation matrix R can be found using the following equation:

$$R^* = \arg\min \left\| \frac{f_v(X_v) - m_v}{\|f_v(X_v) - m_v\|_F} - \frac{f_l(X_l) - m_l}{\|f_l(X_l) - m_l\|_F} R^T \right\|_2 \qquad \text{(Equation 2)}$$

In (Equation 2), $X_v$ and $X_l$ are the vision and language data, e.g. the data of the first modality and the data of the second modality, respectively (where rows from each modality form pairs), my and mi are the means of $f_v(X_v)$ and $f_l(X_l)$, and $\|\cdot\|_F$ is the Frobenius matrix norm. Therefore, in an embodiment, generating the cross-model alignment can include translating the first mapping and the second mapping in a shared embedding space (e.g., the cross-modal alignment), scaling the first mapping and the second mapping in the shared embedding space (e.g., the cross-modal alignment), and rotating the first mapping and the second mapping in the shared embedding space (e.g., the cross-modal alignment).

Referring to blocks 202-212 of the method 200, the process disclosed may be summarized by the following algorithm:

| Algorithm 1: Training Procedure for Triplet Method |
| --- |

| | | |
| --- | --- | --- |
| Input: | Dataset X of paired RGB-D and language features vectors ($x_v$, $x_l$) | |
| Output: | Embedding alignment functions $f_v$ and $f_l$ that map RGB-D and language to a shared space and a trained Procrustes transform. | |
| 1 | $f_v$, $f_l$ ← randomly initialized neural networks | |
| 2 | with parameters $\theta_v$ and $\theta_l$ respectively while not coveraged do | |
| 3 | | $x_a$ ← randomly selected vision or language feature vector from X |

-continued

| Algorithm 1: Training Procedure for Triplet Method |
|---|

```
 4  |    x_p ← randomly selected vision or language
    |       feature vector from X belonging to the
    |       same class as x_a
 5  |    x_n ← randomly selected any other vision or
    |       language feature vector from X belonging
    |       to a different class than x_a and x_p
 6  |    Incur loss L using Equation 2. and back
    |       propagate to update parameters θ_v and θ_l
 7  end
```

$$8 \quad m_v \leftarrow \frac{1}{|X|} \sum_{\forall (x_v, x_l) \in X} f_v(x_v)$$

$$9 \quad m_l \leftarrow \frac{1}{|X|} \sum_{\forall (x_v, x_l) \in X} f_l(x_l)$$

```
10  s_v ← ||f_v(X_v) − m_v||_F
11  s_v ← ||f_l(X_l) − m_l||_F
12  R ← solution to Equation 3
13  return f_v, f_l, m_v, m_l, s_v, s_l, R
```

The method 200 can include block 214 of inputting a first data input file and a second data input file into the cross-modal manifold alignment, the first data input file being a first data domain type and the second data input file being a second data domain type. For example, without limitation, the first data input file may be of the same domain, as the data of the first domain and the second data input file may be of the same domain, as the data of the second domain. Continuing with the previous example, the first data input file may be a language file, e.g., a textual description, and the second data input file may be a visual file, e.g., an RGB-D image. The first and second data input files can include a single piece of data (e.g., a single image) or multiple pieces of data (e.g., a plurality of images). The first data input file and the second data input file may be from the same modality or from different modalities. In an exemplary embodiment, the data receipt module 152 can be configured to execute the method of block 214.

The method 200 can include block 216 of determining a relationship between the first data input file and the second data input file based on the cross-modal manifold alignment. The relationship may indicate that the first data input file and the second data input file represent the same object. For example, without limitation, the first data input file may be a textual description of a tomato and the second data input file may be an RGB-D image of a tomato. In an example where the first data input file and the second data input file are from the same modality, the first data input file may be a photograph of a tomato and the second data input file may be a drawing or illustration of a tomato. In an exemplary embodiment, the data comparison module 156 can be configured to execute the method of block 216.

The method 200 can include block 218 of storing in a database, e.g., the storage 108, the first data input file and the second data input file and the relationship between the first data input file and the second data input file. For example, the first data input file and the second data input file may be stored as a related data pair in the storage 108 (e.g., the domain relationship data 112). In an exemplary embodiment, the data storage module 158 can be configured to execute the method of block 218.

The method 200 can include block 220 of displaying the cross-modal alignment. For example, the cross-modal alignment may be displayed on the display device 130 via the graphical user interface 132 as the manifold output 134.

Figures 3A, 3B:
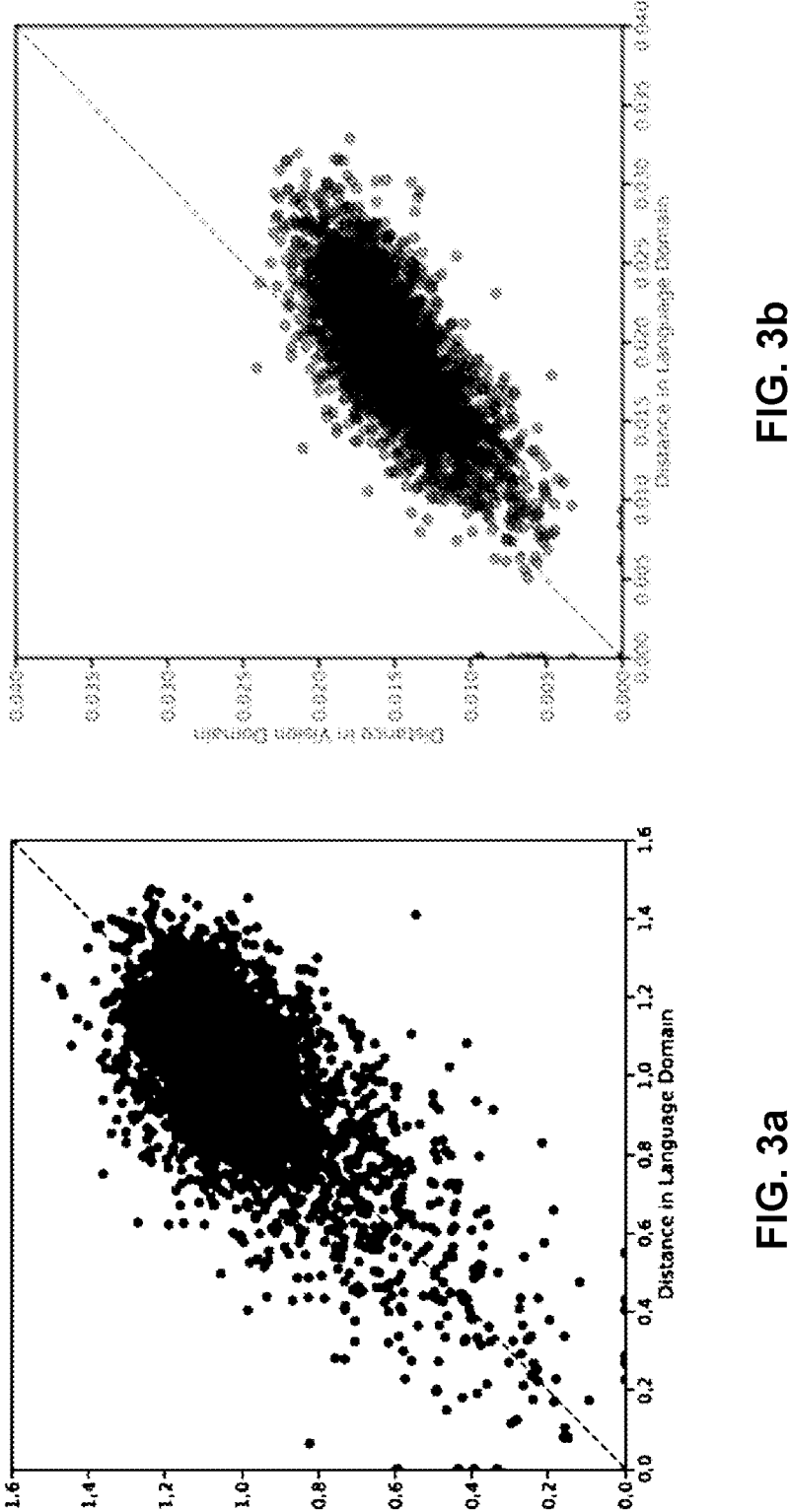
FIGS. 3a-3b illustrate example metrics demonstrating manifold alignments in accordance with exemplary embodiments.

Referring to FIG. 3*a*, an example cross-modal alignment between vision data and language data using triplet loss is illustrated. Referring to FIG. 3*b*, an example cross-modal alignment between vision data and language data using triplet loss with Procrustes analysis is illustrated. In an exemplary embodiment, the display module 166 can be configured to execute the method of block 220.

It can be appreciated that blocks 202-212 of the method 200 can represent the training of a cross-modal alignment algorithm capable of generating a cross-modal alignment for data pairs of different domains. Further, it can be appreciated that blocks 214-220 of the method 200 can represent utilizing the trained cross-model algorithm on a new data pair, e.g., the first data input file and the second data input file.

A person having ordinary skill in the art would appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, one or more of the disclosed modules can be a hardware processor device with an associated memory.

A hardware processor device as discussed herein can be a single hardware processor, a plurality of hardware processors, or combinations thereof. Hardware processor devices can have one or more processor "cores." The term "non-transitory computer readable medium" as discussed herein is used to generally refer to tangible media such as a memory device.

Various embodiments of the present disclosure are described in terms of an exemplary computing device. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multiprocessor machines. In addition, in some embodiments the order of operations can be rearranged without departing from the spirit of the disclosed subject matter.

A system, as used herein, can be in combination with one or more nodes, wherein the system resides in the one or more nodes. A node can be configured to interface or contain one or more components of the systems described herein.

A hardware processor, as used herein, can be a special purpose or general purpose processor device. The hardware processor device can be connected to a communications infrastructure, such as a bus, message queue, network, multi-core message-passing scheme, etc. An exemplary computing device, as used herein, can include a memory (e.g., random access memory, read-only memory, etc.), and can also include one or more additional memories. The memory and the one or more additional memories can be read from and/or written to in a well-known manner. In an embodiment, the memory and the one or more additional memories can be non-transitory computer readable recording media.

Data stored in the exemplary computing device (e.g., in the memory) can be stored on any type of suitable computer readable media, such as optical storage (e.g., a compact disc, digital versatile disc, Blu-ray disc, etc.), magnetic tape storage (e.g., a hard disk drive), solid-state drive, etc. An operating system can be stored in the memory.

In an exemplary embodiment, the data can be configured in any type of suitable data storage configuration or database configuration, such as a relational database, a structured query language (SQL) database, a distributed database, an object database, etc. Suitable configurations and storage types will be apparent to persons having skill in the relevant art.

The exemplary computing device can also include a communications interface. The communications interface can be configured to allow software and data to be transferred between the computing device and external devices. Exemplary communications interfaces can include a modem, a network interface (e.g., an Ethernet card), a communications port, a PCMCIA slot and card, etc. Software and data transferred via the communications interface can be in the form of signals, which can be electronic, electromagnetic, optical, or other signals as will be apparent to persons having skill in the relevant art. The signals can travel via a communications path, which can be configured to carry the signals and can be implemented using wire, cable, fiber optics, a phone line, a cellular phone link, a radio frequency link, etc.

Memory semiconductors (e.g., DRAMs, etc.) can be means for providing software to the computing device. Computer programs (e.g., computer control logic) can be stored in the memory. Computer programs can also be received via the communications interface. Such computer programs, when executed, can enable the computing device to implement the present methods as discussed herein. In particular, the computer programs stored on a non-transitory computer-readable medium, when executed, can enable a hardware processor device to implement the exemplary methods, or similar methods, as discussed herein. Accordingly, such computer programs can represent controllers of the computing device.

Where the present disclosure is implemented using software, the software can be stored in a computer product or non-transitory computer readable medium and loaded into the computing device using a removable storage drive or communications interface. In an exemplary embodiment, any computing device disclosed herein can also include a display interface that outputs display signals to a display unit, e.g., LCD screen, plasma screen, LED screen, DLP screen, CRT screen, etc.

It will be appreciated by those skilled in the art that the present disclosure can be embodied in other specific forms without departing from the spirit or essential characteristics thereof. The presently disclosed embodiments are therefore considered in all respects to be illustrative and not restrictive. The scope of the disclosure is indicated by the appended claims rather than the foregoing description, and all changes that come within the meaning, range, and equivalence thereof are intended to be embraced therein.

What is claimed is:

1. A method for cross-modal manifold alignment of different data domains, the method comprising:
   determining for a shared embedding space a first embedding function for data of a first domain and a second embedding function for data of a second domain using a triplet loss, wherein triplets of the triplet loss include an anchor data point from the first domain, and a positive and a negative data point from the second domain, wherein the first domain includes RGB color data and RGB depth data;

colorizing plural RGB depth features of the RGB depth data by distributing the plural RGB depth features across plural RGB color features of the RGB color data;
creating a first mapping for the data of the first domain using the first embedding function in the shared embedding space;
creating a second mapping for the data of the second domain using the second embedding function in the shared embedding space;
generating a cross-modal manifold alignment for the data of the first domain and the data of the second domain; and
training a classifier model based on the cross-modal manifold alignment of the data of the first domain and the data of the second domain,
wherein the generating the cross-modal alignment includes:
   superimposing one of the first mapping or the second mapping on the other of the first mapping or second mapping to generate a cross-modal manifold alignment, the superimposing including one or more of:
translating the first mapping and/or the second mapping in the shared embedding space,
scaling the first mapping and/or the second mapping in the shared embedding space, and/or
rotating the first mapping and/or the second mapping in the shared embedding space by generating a rotation matrix based on a difference between a first term and a second term, the first term including a first ratio of a first difference between the first embedding function and an average of the first embedding function to a Frobenius matrix of the first difference, and the second term including a second ratio of a second difference between the second embedding function and an average of the second embedding function to a Frobenius matrix of the second difference.

2. The method of claim 1, wherein the first domain and the second domain are from the same modality.

3. The method of claim 1, wherein the first domain and the second domain are from different modalities.

4. The method of claim 1, including:
inputting a first data input file and a second data input file into the cross-modal manifold alignment, the first data input file being of the first domain and the second data input file being of the second domain;
determining a relationship between the first data input file and the second data input file, wherein the relationship indicates the first data input file and the second data input file represent the same object based on the cross-modal manifold alignment; and storing in a database the first data input file and the second data input file and the relationship between the first data input file and the second data input file.

5. The method of claim 1, further comprising:
extracting the plural RGB color features and the plural RGB depth features from the first domain;
generating feature vectors from the RGB color features and the colorized RGB depth features; and
concatenating the RGB color feature vectors and the colorized RGB depth feature vectors.

6. The method of claim 1, wherein the superimposing further comprises at least one of:
translating the first mapping and/or the second mapping in the shared embedding space; and
scaling the first mapping and/or the second mapping in the shared embedding space.

7. A system for cross-modal manifold alignment of different data domains, the system comprising:

a processor configured to:

determine for a shared embedding space a first embedding function for data of a first domain and a second embedding function for data of a second domain using triplet loss, wherein triplets of the triplet loss include an anchor data point from the first domain and a positive and a negative data point from the second domain, wherein the data of the first domain includes RGB color data and RGB depth data;

colorize plural RGB depth features of the RGB depth data by distributing the plural RGB depth features across plural RGB color features of the RGB color data;

create a first mapping for the data of the first domain using the first embedding function in a shared embedding space;

create a second mapping for the data of the second domain using the second embedding function in the shared embedding space; and generate a cross-modal manifold alignment for the data of the first domain and the data of the second domain, train a classifier model based on the cross-modal manifold alignment of the data of the first domain and the data of the second domain, wherein to generate the cross-modal manifold alignment the processor is configured to:

superimpose one of the first mapping or the second mapping on the other of the first mapping or second mapping to generate a cross-modal manifold alignment, wherein to superimpose one of the first mapping or the second mapping on the other of the first mapping or second mapping, the processor is configured to at least rotate the first mapping and/or the second mapping in the shared embedding space by generating a rotation matrix based on a difference between a first term and a second term, the first term including a first ratio of a first difference between the first embedding function and an average of the first embedding function to a Frobenius matrix of the first difference, and the second term including a second ratio of a second difference between the second embedding function and an average of the second embedding function to a Frobenius matrix of the second difference.

8. The system of claim 7, wherein the first domain and the second domain are from the same modality.

9. The system of claim 7, wherein the first domain and the second domain are from different modalities.

10. The system of claim 7, wherein the processor is configured to:

input a first data input file and a second data input file into the cross-modal manifold alignment, the first data input file being of the first domain and the second data input file being of the second domain;

determine a relationship between the first data input file and the second data input file, wherein the relationship indicates the first data input file and the second data input file represent the same object based on the cross-modal manifold alignment; and store in a database the first data input file and the second data input file and the relationship between the first data input file and the second data input file.

11. The system of claim 7, wherein the data of the first domain is Red, Green, Blue, Depth (RGB-D) sensor data.

12. The system of claim 7, wherein to superimpose one of the first mapping or the second mapping on the other of the first mapping or second mapping, the processor is further configured to:

translate the first mapping and/or the second mapping in the shared embedding space; and/or scale the first mapping and/or the second mapping in the shared embedding space.

13. A computer-implemented method comprising:

creating a representation of a cross-modal manifold alignment, in a latent space, for robotics data spanning plural heterogenous domains including a first domain comprising domain data from a robotics language model and a second domain comprising domain data from a robotics imaging model;

determining a data pair for the robotics data across the first domain and the second domain based on an analysis of the cross-modal manifold alignment, wherein the determining of the data pair comprises correlating words from the robotics language model of the first domain with robotics sensor image data including RGB-D image data of the second domain based on the analysis of the cross-modal manifold alignment;

training, based on the determining of the data pair, a cross-modal alignment algorithm to identify a plurality of data pairs for the robotics data across at least the first domain and the second domain using the cross-modal manifold alignment;

generating the representation cross-modal manifold alignment for the robotics data by superimposing a first manifold for the first domain with a second manifold for the second domain, which includes optimizing a translation, a scaling, and a rotation of the first manifold and the second manifold to generate the representation, the first manifold and the second manifold being obtained from a first manifold mapping file for the first domain and a second manifold mapping file for the second domain; and wherein optimizing a translation, a scaling, and a rotation of the first manifold and the second manifold includes generating a rotation matrix based on a difference between a first term and a second term of a shared embedding space, the first term including a first ratio of a first difference between a first embedding function and an average of the first embedding function to a Frobenius matrix of the first difference, and the second term including a second ratio of a second difference between a second embedding function and an average of the second embedding function to a Frobenius matrix of the second difference.

14. The computer-implemented method of claim 13, further comprising: using the cross-modal alignment algorithm to identify a new data pair for the robotics data.

15. The computer-implemented method of claim 13, further comprising: generating a robotics domain-specific data set based on the plurality of data pairs for the robotics data identified in the training.

16. The computer-implemented method of claim 15, further comprising: further comprising: storing the robotics domain-specific data set in a database for access and use.

17. The computer-implemented method of claim 13, wherein the creating of the representation of the cross-modal manifold alignment further comprises: analyzing a first manifold mapping file for the first domain and a second manifold mapping file for the second domain, generating, based on the analyzing of the first manifold mapping file and the second manifold mapping file, the representation cross-modal manifold alignment for the robotics data by super-imposing a first manifold for the first domain with a second manifold for the second domain, which includes optimizing a translation, a scaling, and a rotation of the first manifold and the second manifold to generate the representation, and displaying the representation of a cross-modal manifold alignment, via a graphical user interface, for visual inspection of the cross-modal manifold alignment.

18. The computer-implemented method of claim 17, further comprising: recasting the representation of the cross-modal manifold alignment based on an evaluation of an output from the creating of the representation of the cross-modal manifold alignment.

19. The computer-implemented method of claim 17, wherein the robotics data spanning the plural heterogenous domains includes robotics sensor data in the form of at least one of: a third domain comprising domain data from a model of audio data, a fourth domain comprising domain data from a model for pressure data, a fifth domain comprising domain data from a model of temperature data, a sixth domain comprising domain data from a model of haptic data, and a seventh domain comprising domain data from a model of motion data, and wherein the robotics sensor data is included in the representation of the cross-modal manifold alignment.

20. The computer-implemented method of claim 19, wherein the training further comprises identifying one or more data pairs between the robotics sensor data and one of the first domain and the second domain.

\* \* \* \* \*